Jan. 15, 1963  W. A. OWEN  3,073,623
TRAILER BRAKE CONTROL FOR ANTI-JACKKNIFING PURPOSES
Filed July 14, 1960  3 Sheets-Sheet 1
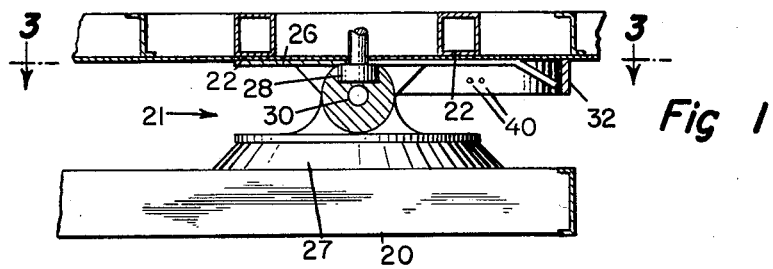
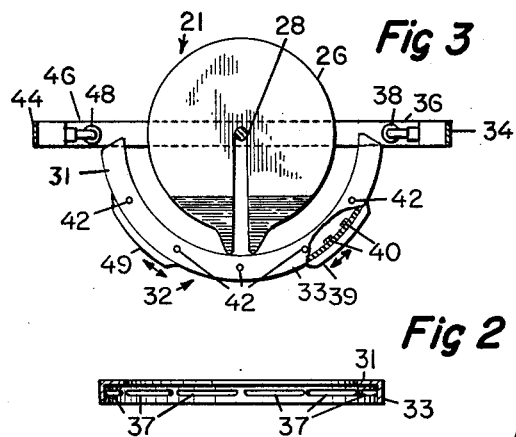
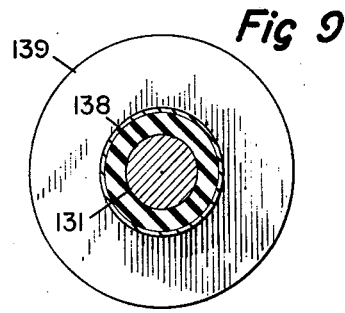
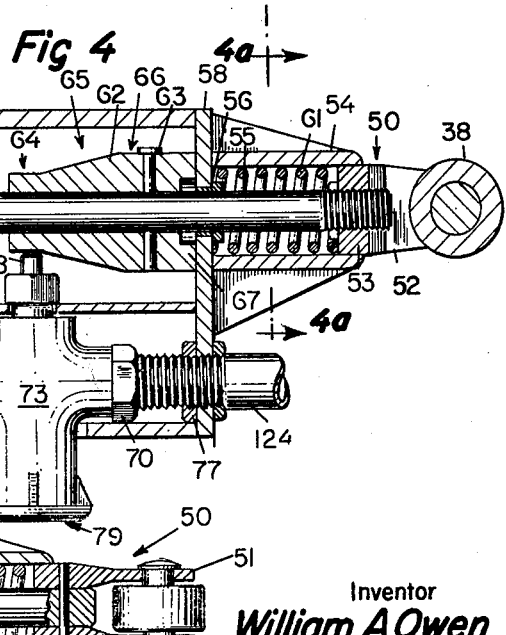
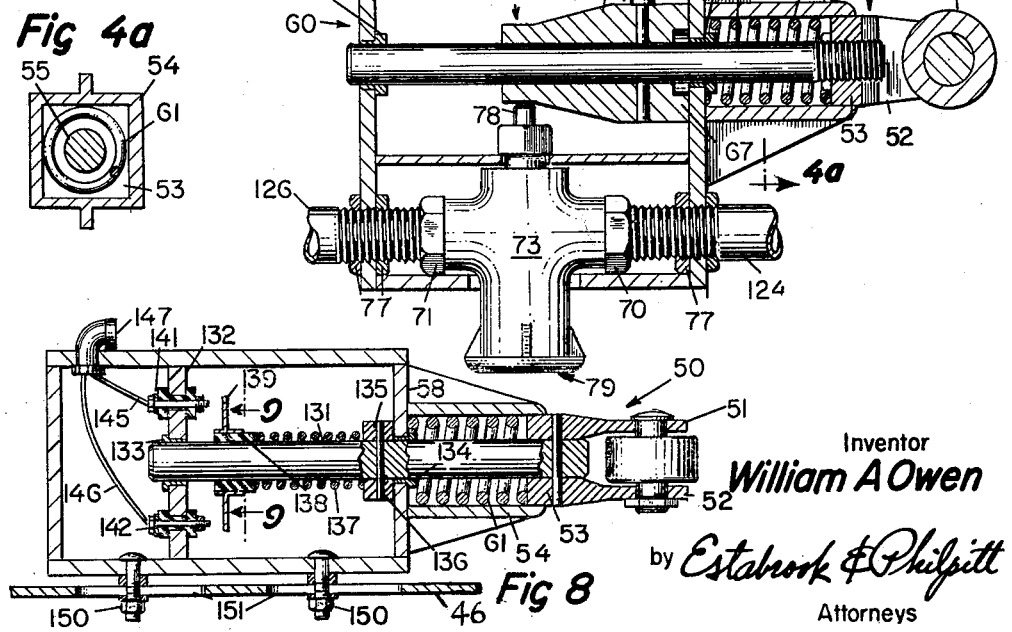
Inventor
William A Owen
by Estabrook & Philpitt
Attorneys

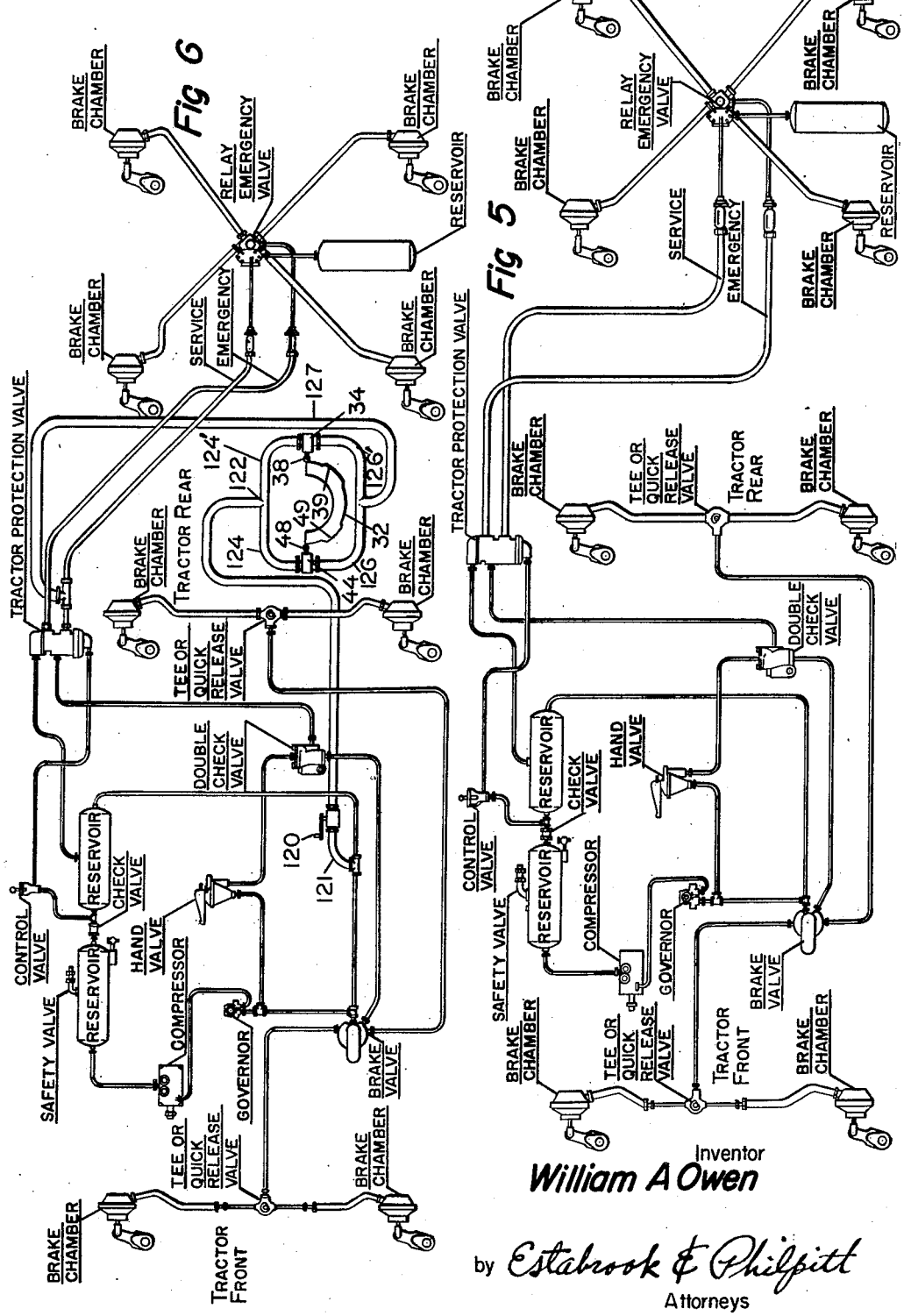

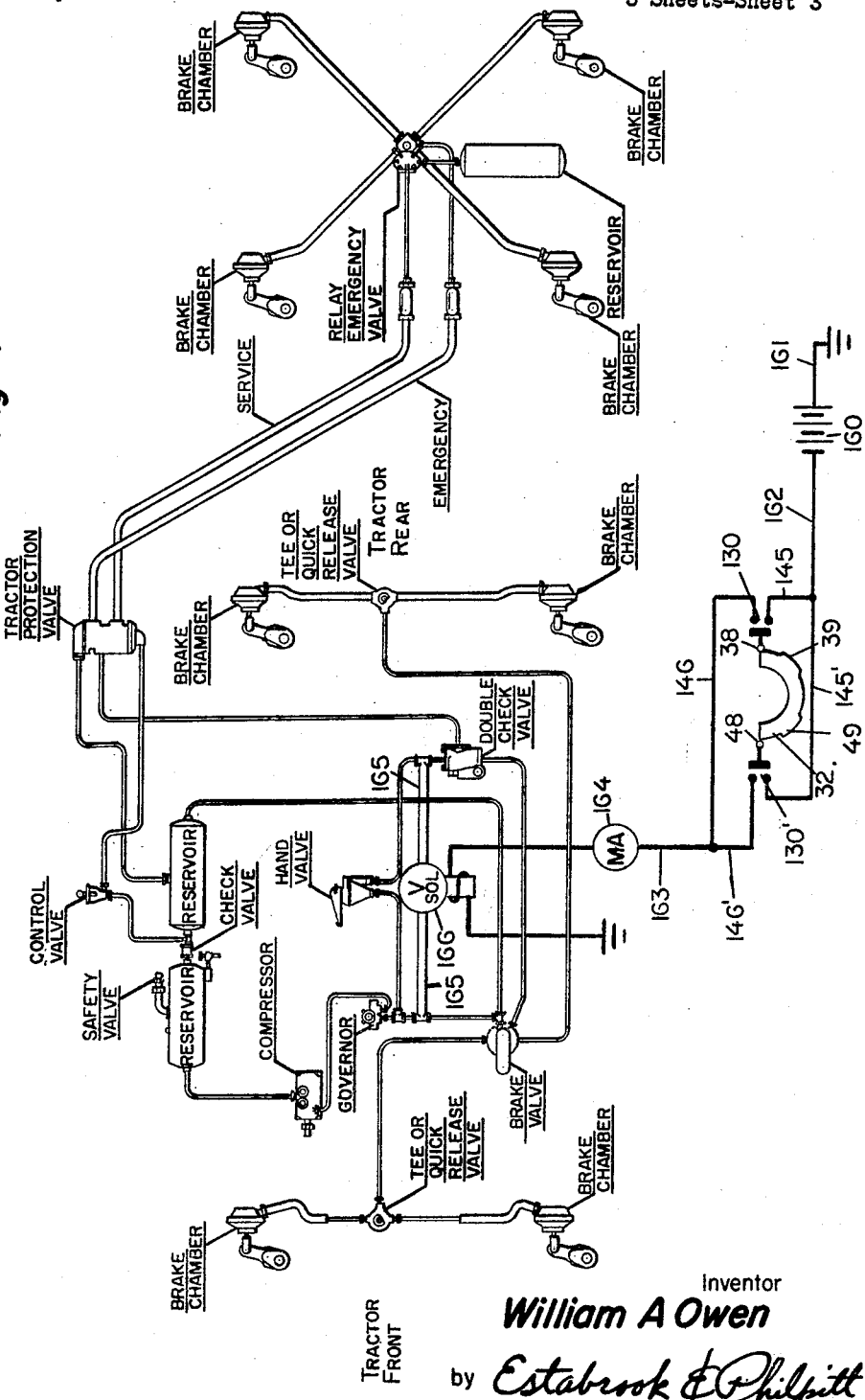

United States Patent Office 3,073,623
Patented Jan. 15, 1963

3,073,623
TRAILER BRAKE CONTROL FOR ANTI-JACK-KNIFING PURPOSES
William A. Owen, 401 E. Chilhowie Ave.,
Johnson City, Tenn.
Filed July 14, 1960, Ser. No. 42,839
9 Claims. (Cl. 280—432)

This invention relates to tractor-trailer combinations, and more particularly, to means associated therewith for the application of the trailer brakes when the angle between the tractor and trailer exceeds a predetermined number of degrees.

Freedom of movement between the tractor and trailer, while necessary, creates many practical problems in the day-to-day operation of tractor-trailer units. One of the many problems is jack-knifing, the occurrence of a pivoting of the trailer about its vertical axis of rotation, with respect to the tractor and away from the longitudinal axis of the tractor through an angle great enough to throw the vehicle out of control. It has been the cause of many accidents and it often occurs while the driver's attention is diverted by other matters such as a steep hill requiring a change of gears, a sharp curve, a slippery patch of pavement, or an obstruction which suddenly appears on the road ahead.

Various means have been employed to assist the driver in preventing such accidents from happening. One method employs lugs depending from the trailer frame for contacting a stop on the tractor frame when the trailer reaches a certain angle relative to the tractor. Another method employs a specially constructed fifth wheel coupling with its upper bearing plate fixed against rotation with respect to the trailer and having an automatically actuated system to apply a counter rotational force through the fifth wheel in the opposite direction to that of the jack-knifing action. In still another type of anti-jack-knife system the trailer and tractor are interconnected by gears, one on the trailer, another on the tractor. One is a fixed gear, the other is rotatable, but is provided with a hydraulic lock by which the tractor and trailer are locked against further rotation in the vertical axis. Another means employs a plurality of hydraulic rams fixed between a point near the rear of the trailer and the buffer bar on the tractor with a hydraulic restricter which limits the flow between the rams and consequently the turning of the trailer.

The addition of such means to an articulated vehicle is very worthwhile from the standpoint of safety, and yet most of the tractor-trailer units on the highway today are not equipped with any such device. Some possible explanations of the failure of truck operators to adopt at least one of the above-described systems may be found in their reluctance to add to their tractor trailers any device which lengthens the coupling operation, requires maintenance, is expensive to install or which requires extensive modification of the trailer. Many tractor owners haul trailers owned by several other firms. If the trailer owners do not equip their trailers with such devices, there is no usefulness in equipping the tractor with them. Therefore, in view of the advantages to be gained in the safety of the truck, its driver and other users of the highways, an accident preventing control which requires very little alteration of the trailer, in no way lengthens the coupling operation, is relatively inexpensive to install, and is virtually maintenance-free, is greatly to be desired. It is also desirable that the control be automatic, since loss of control over the trailer often begins while the driver is preoccupied with attempting to avert trouble from some source external to the truck, and ends in a wreck before he is able to react.

Therefore it is a primary object of this invention to provide an improved device for automatically countering the incipient stages of the jack-knifing of an articulated vehicle without the intervention of the vehicle driver.

Another object of this invention is to provide an improved brake control device requiring only slight modification of the towed vehicle for ease and economy of installation of the device on large fleets of trailers.

A further object of the invention is to make available for tractor-trailer combinations a control system which requires the driver to make, during the trailer coupling operation, only those connections which are ordinarily made on tractor-trailer combinations not equipped with the control.

Another object of this invention is to provide a control which may be added to the existing brake system of an articulated vehicle for automatically bringing the vehicle under control before the angle between the tractor and trailer is sufficient to cause a wreck.

Still another object of this invention is to provide an automatic control for initially applying a pre-selected corrective braking force during the incipient stages of jack-knifing, followed by the application of additional braking force in the event that the initial corrective braking is not sufficient to prevent an increase in the angle of the trailer relative to the tractor. Other objects will be apparent to one skilled in the art.

Generally speaking, my invention is characterized by the following essential elements;

A. A towed vehicle provided with a cam means centered about the vertical pivot axis of the hitch on said towed vehicle.

B. On the towing vehicle, sensing means for actuation by said cam means when the longitudinal axis of the trailer is at a pre-determined angle to the longitudinal axis of the towing vehicle.

C. Brake actuating means responsive to the actuation of said sensing means for operating brakes on said towed vehicle.

In the accompanying drawings and in the following description, I have shown a specific embodiment of this invention, and several modifications thereof. These are only a few of many forms in which this invention may be embodied and it is to be understood that the above-mentioned essential elements are not limited to any specific construction but may be embodied in various forms without departing from the spirit of the invention. It should also be understood that although parts have been identified in the following description by specific names for convenience, they are intended to be generic in their application to similar parts.

In the drawings in which like reference numerals refer to like parts throughout the several views, and in which sections are taken looking in the direction of the arrows at the ends of the section lines:

FIGURE 1 is a side elevation of the coupled units of an articulated vehicle showing a portion of the tractor; a portion of the trailer; the boxes holding the sensing means mounted on the tractor frame; the cam means mounted on the trailer; and a fifth-wheel type coupling on the tractor frame.

FIGURE 2 is a detail view of the cam means showing mounting holes for adjustably mounting cam surfaces thereon.

FIGURE 3 is a top sectional view taken above the fifth wheel along the line 3—3 and showing the fifth wheel, cam, tractor frame, and the sensing means.

FIGURE 4 is a top sectional view of a pneumatic sensing means.

FIGURE 4a is a cross-sectional detail view of the sensing means piston housing.

FIGURE 5 is a schematic plan of an ordinary tractor-trailer braking system.

FIGURE 6 is a modification in accordance with my invention of the braking system plan shown in FIGURE 5 for use with the sensing means shown in FIGURE 4.

FIGURE 7 is an alternate method of modifying the ordinary tractor-trailer braking system shown in FIGURE 5 for use with electric sensing means.

FIGURE 8 is a side sectional view of an electric sensing means to be utilized in connection with the system shown in FIGURE 7.

FIGURE 9 is a sectional view of the contact member in the electric sensing means in FIGURE 8.

As shown in FIGURE 1 a tractor frame member 20 is coupled to trailer frame members 22 by means of a fifth wheel type coupling 21 having base member 27 attached to the tractor frame, horizontal pivots 30 attached to the base 27, and, attached to said pivots, an upper bearing plate 26 which supports the weight of the forward end of the trailer while grasping the trailer pivot or king pin 28. What has been described thus far does not differ from common tractor-trailer units in use everywhere.

In accordance with my invention, the trailer is fitted with cam means 32 which is bolted or otherwise fastened on the underneath side of the trailer frame 22 and is centered around the vertical axis of rotation of the tractor with respect to the trailer. The cam means 32 may take any form which is capable of carrying out the intended function, but in this embodiment (see FIGURE 3), the cam means 32 is substantially semi-circular in over-all shape and generally L-shaped in cross-section, as is shown in FIGURE 2. The upper face 31 of cam means 32 is provided with circular mounting holes 42 (FIGURE 3) through which pass the mounting bolts (not shown) which secure cam means 32 to the underside of the trailer. The curved outer face 33 of cam means 32 is provided with oblong slots 37 to receive mounting bolts 40 for shiftably securing cam surfaces 39 and 49, as shown in the broken out portion of FIGURE 3. By loosening the bolts 40, it is possible to shift the cam surfaces 39 and 49 back and forth across the outer face 33 within limits determined by the length and placement of the slots 37 to alter the angular displacement of the cam surfaces 39 and 49 with respect to the center line of the trailer. Although the shiftable mounting of the cam surfaces 39 and 49 is preferred, it should be obvious to those skilled in the art that it would be possible to dispense with the slots 37 and replace them with circular holes, or dispense with all mounting bolts and holes whatsoever and simply weld the cam surfaces 39 and 49 to the outer face 33.

Also shown in FIGURE 3, are sensing means 34 and 44, which are mounted upon the tractor by means of mounting brackets 36 and 46. The sensing means are disposed on opposite sides of the tractor and face each other across the center of the fifth wheel coupling 21. Both sensing means are provided with roller tappets 38 and 48. Each sensing means may be adjusted laterally to alter its distance from the center of fifth wheel coupling 21 by means of oblong slots (see 151 of FIGURE 8) provided in mounting brackets 36 and 46 in the well-known manner. In order to adjust the position of the sensing means 34 and 44, it is necessary only to loosen the mounting nuts (150 of FIGURE 8) fastening the sensing means to its bracket, move the sensing means to the desired position within the limits allowed by the length of said oblong slots 151 and retighten the mounting nuts 150. In practice, the sensing means are positioned so that the roller tappets 38 and 48 barely clear the outer face 33 of cam means 32, but readily engage the cam surfaces 39 and 49 when the trailer and cam means 32 turns through an angle sufficiently great to present the cam surfaces to the fully extended roller tappets 38 and 48. In this embodiment the displacement of each cam surface is adjusted to 30° from the center line of the trailer, but this angle can of course be varied to suit road conditions. The angle selected should be greater than the maximum trailer angle encountered in open-road driving, so that the control will not be actuated by the turning of the trailer when the tractor-trailer is negotiating curves.

Sensing means 44 is similar in every respect to sensing means 34. Although they are mounted upon opposite sides of the fifth wheel, their operation is identical in every respect, therefore everything that is stated with regard to sensing means 34 in the following detailed explanation of FIGURE 4 applies with equal force to sensing means 44. The roller tappet on each sensing means is secured to a bifurcate piston 50 having arms 51 and 52 (see FIGURE 8) and generally rectangular base portion 53. Said base portion 53 is disposed in a housing 54 having internal dimensions slightly larger than the base portion 53, so that the piston is free to slide in and out of the housing 54, but is unable to rotate about its own longitudinal axis (see FIGURE 4a). The piston 50 is also provided with a longitudinal center hole in which is secured a rod 55 which extends from the piston back through two walls 58 and 59 of the sensing means case 60, in which the rod is slidably engaged by bushings 55 and 57 respectively. In the housing 54, coiled about rod 55 between the piston base portion 53 and sensing means case wall 58 is spring means 61 for holding roller tappet 38 in its fully extended position. Inside the case 60 is a cam 62 on rod 55, upon which it is fixedly secured by a driven taper pin 63. At the end of cam 62 which is furthest from roller tappet 38 there is a cylindrical portion 64 of relatively small diameter. At the end of the cam 62 which is nearest roller tappet 38 there is a cylindrical portion 66 having an annular inner extension 67 which limits the outward travel of the piston 50 and roller tappet 38 by contacting sensing means case wall 58 before the rectangular base portion 53 of the piston 50 escapes the housing 54.

Secured and protected within the case 60 is a spring-loaded air valve 73 having inlet pipe 124 and outlet pipe 126 extending through the case walls 58 and 59 respectively. Each of said pipes has been threaded to screw into threaded inlet and outlet ports 70 and 71 in the valve body. Four mounting nuts 77 are threaded on the pipes for securing said pipes and said valve in the case 60.

Protruding from one side of valve body is a plunger 78 for actuating said valve. The valve is a spring-loaded pressure-reducing valve. When the plunger 78 is fully extended, the outlet port 71 is in communication with an exhaust port 79. As soon as plunger 78 is depressed the exhaust port 79 is closed and air pressure is transmitted to the outlet port 71. In this regard the valve 73 is similar in operation to the foot brake air valves in use on many trucks. The valve 73 is positioned so that when the plunger 78 and the roller tappet 38 are both fully extended, the plunger 78 is adjacent but does not quite touch the small cylindrical portion 64 of cam 62. If the roller tappet 38 is pushed inward toward housing 54, the conical cam surface 65 is moved inward by the rod 55 which connects the cam 62 to the tappet. The result is that the conical cam surface 65 of the cam 62 presses on the plunger 78 and operates the valve. The further the cam 62 is urged to the left the greater the depression of plunger 78, and consequently, the greater the pressure built up in the outlet port 71. In this way the pressure in the outlet of valve 73 is controlled by how far roller tappet 38 is urged inwardly, making possible a graduated application of the trailer brakes.

FIGURE 5 schematically depicts a braking system commonly utilized on tractor-trailer units. It is an air-brake system having a compressor; tractor air reservoir, safety valve and a check valve connected to a second tractor reservoir with a pressure line connecting the second reservoir to a foot-operated brake valve in the cab of the tractor from which emanate feeder lines and for the front and rear brakes on the tractor. The feeder lines pass air pressure from the foot operated valve to the tractor wheel cylinders, each of which operates the brake shoes on one of the wheels of the tractor.

Also emanating from the foot brake valve is a third line which transmits air through a double check valve to a tractor protection valve. The tractor protection valve is able to automatically produce an immediate application of the trailer brakes without the driver's aid and shut off the communication between the tractor brake system and the trailer brake system in case of an abnormal loss of air pressure. Connected to tractor protection valves are a service hose and an emergency hose, terminating in couplings. Said couplings carry air from the tractor to matching couplings on the trailer. The service hose communicates with the trailer relay emergency valve through the couplings and through a pressure line on the trailer. Air released by the driver from the tractor reservoirs and by use of the brake valves through the check valve, tractor protection valve, service hose, couplings and trailer line to the trailer relay emergency valve, causes that valve to admit air from the trailer reservoir to the trailer wheel cylinders, actuating a brake on each wheel. Since the foot-operated brake valve also feeds the tractor brake cylinders at the same time, braking occurs on all wheels at once.

On the tractor, there is also a hand valve for ordinary service applications of the trailer brakes alone. This valve receives air from the pressure side of the brake valve. When the hand valve is opened air flows through the double check valve, the tractor protection valve, service hose, couplings and trailer line to trailer relay emergency valve which admits air from the trailer reservoir to the trailer brake cylinders. The system shown in FIGURE 5 is no part of the present invention, and is representative of brake systems which have previously been used.

FIGURE 6 shows schematically the system of FIGURE 5 with the addition of one embodiment of my invention. In accordance with this embodiment of my invention, a line 121 is tapped to the reservoir, or an open line from the reservoir. Line 121 terminates in a T fitting 122 which communicates with two lines 124 and 124, each of which is connected with the inlet port 70 (see FIGURE 5) of an air valve 73 in sensing means 44 and 34. The outlet ports 71 of said valves 73 are each connected to outlet pipes 126 and 126, both of which are connected indirectly to the trailer service line. In the line 121 is a hand valve 120 to cut off the supply of air from the tractor reservoir 85 to the sensing means 34 and 44.

I shall now described the operation of the above embodiment of my invention. When on the road, the driver leaves valve 102 open. Visualize tractor-trailer unit proceeding down the highway. The driver takes his foot off the accelerator and swerves to avoid an obstruction in the road, whereupon the vehicle begins to slide out of control with the tractor turned to the right side of the longitudinal axis of the trailer. The angle between the longitudinal axis of the tractor and that of the trailer increases until it exceeds 30°. It is to be recalled that the cam surfaces 39 and 49 were displaced 30° from the longitudinal axis of the trailer (FIGURE 3). Therefore as soon as the angle between tractor and trailer is in excess of 30°, cam means 49 pushes roller tappet 48 inward, causing cam 62 to completely depress plunger 78 on valve 73 in sensing means 44 allowing full reservoir pressure to flow from reservoir 85, line 121, valve 120, T 122, inlet pipe 124, valve 73 in sensing means 44, outlet pipe 126, line 127, the service hose, couplings and trailer line, into the trailer relay emergency valve which causes full air pressure from the trailer reservoir to actuate the trailer brakes. The resulting application of the trailer service brakes will combat the tendency of the vehicle to jack-knife further. As the tractor moves forward while the trailer is braked there is a decided tendency for the fifth-wheel coupling to straighten out. The results would be the same if the vehicle jack-knifed to the left instead of the right, except that the air would travel to the trailer via sensing means 34, instead of sensing means 44, both of which are identical in operation.

When the folding of the vehicle has been checked and the angle of the tractor relative to the trailer decreases to less than 30°, cam means 49 disengages from roller tappet 48 which snaps back to its extended position, thus releasing valve 73, exhausting the pressure in the outlet port of valve 73, and cutting off the pressure transmitted to trailer emergency relay valve de-activating the trailer brakes; and putting the driver back in full control.

Of course, there may be some circumstances in which it may be desirable to disable the anti-jack-knife control system. For instance, ordinarily the control would be automatically actuated whenever the tractor-trailer negotiated a sharp corner within a town. For this reason, my invention is provided with a shut-off valve 120 in the cab by means of which the driver may cut off the control at any time. This valve simply cuts off the supply of air from the reservoir to the sensing means, which are thereby rendered incapable of transmititng any air to the trailer relay emergency valve.

Another embodiment of my invention employs sensing means having electric switches within them rather than air valves. In FIGURE 8 is shown an example of such an electrical sensing means. It has a piston 50, arms 51 and 52, base portions 53 of said piston, housing 54, case wall 58, and spring means 61, which are identical in form and function to like parts in sensing means 34. The piston 50 is provided with a longitudinal center hole in which is secured a cylindrical rod 131 which extends from the piston back through the front wall 58 and through an interior wall 132 of the sensing means case. Where rod 131 passes through said walls—it is slidably engaged by bushings 133 and 134 respectively. Just inside the front wall 58, a stop washer 135 is secured on rod 131 by a taper pin 136, which retains the stop washer 135 in the proper position to prevent piston 50 from escaping the housing 54 at the extreme outer limit of its travel. Directly adjacent washer 135 on the side of it which is opposite wall 58 is a second spring means 137. Adjacent spring means 137 on rod 131 is a sliding contact in the form of a hollow cylindrical insulating bushing 138 having secured thereon a conducting contact disc 139 perpendicular to rod 131. The bushing is of some durable friction resistant material such as nylon, Teflon or the like, and the sliding contact 138 is electrically isolated thereby from the rod 131.

When cam means 32 on the trailer engages roller tappet 38, pushing piston 50 and rod 131 inward, stop washer 135 moves with the rod 131, exerting pressure on sliding contact 138 through spring means 137. Contact disc 139 is thus urged into engagement with stationary contacts 141 and 142, thereby completing a connection between the conductor wires 145 and 146 which are connected to stationary contacts 141 and 142 respectively and enter sensing means case 130 through a waterproof insulating elbow gromnut 147.

In FIGURE 7 is shown an adaptation of the ordinary brake system shown in FIGURE 5. This schematic diagram shows an embodiment of my invention wherein an ordinary brake system has been altered in accordance with my invention to produce a wreck preventing control wherein the sensing means are electrical rather than pneumatic in their mode of operation. In this modification a solenoid operated valve 166, has been placed in the air brake system to open and feed air to the trailer brakes whenever the electric contacts are closed in the sensing means. I have chosen in this illustration to show the solenoid valve 166 in parallel with the trailer hand brake valve. However, it need not be limited to this position. For instance, it could also be placed in a direct line between the reservoir and the trailer service hose.

The sensing means 130 is mounted on the tractor frame, just as sensing means 34 was in the preferred embodiment above. Another sensing means 130¹ which is identical to sensing means 130, and in which like parts are identified by like numerals having a prime mark to distinguish between them and the parts of sensing means 130, is mounted on the left side of the tractor frame as was sensing means 44 in the above preferred embodiment. The tractor battery 160 has a terminal 161 which is grounded and a second terminal 162 from which lead the conductors 145 and 145¹ to the stationary contacts 141 and 141¹ in sensing means 130 and 130¹. From the other stationary contacts 142 and 142¹, conductor wires 146 and 146¹ lead to another conductor wire 163 which is connected to one terminal on solenoid valve 166. The other terminal on valve 166 is grounded. A S.P.S.T. switch 164 is provided in the circuit to cut off the valve 166 from the battery. In this case it is palced in conductor wire 163. The valve 166 is of the type which remains positively and fully closed at all times, except when the solenoid is energized.

In actual operation, whenever a truck equipped in accordance with this modification of my invention is travelling down the highway, the switch 164 will normally be closed. If the trailer begins to slide out of control with the tractor turned to the left and the angle between the longitudinal axes of the tractor and trailer exceeds 30°, cam surface 39 will press roller tappet 38 inward, which in turn moves the rod 131, stop washer 135, spring means 137, and contact disc 139 to engage with stationary contacts 141 and 142 respectively. As a result a circuit is completed having the following path: ground, 161, 160, 162, 145, 141, 139, 142, 146, 163, 164, 166 and ground. Consequently, the solenoid opens immediately, allowing full air pressure to flow from the tractor reservoir through line 64, valve 166, the double check valve, the tractor protection valve, the trailer service line, the couplings and trailer line 104 to the trailer relay emergency valve which valves air from trailer reservoir to the trailer wheel cylinders. When the trailer angle diminishes to less than 30°, the cam surface 39 disengages roller tappet 38. Spring means 61 releases the contact disc 139 from the contacts 141 and 142 thus breaking the electrical circuit, whereupon the valve 166 closes itself, shutting off the air to the trailer brakes and releasing them. If the action takes place with the tractor turned to the right of center, cam surface 49 closes the contacts within sensing means 130¹ and completes a circuit having the path: ground 161, 160, 162, 145¹, 141¹, 139¹, 142¹, 146¹, 163, 164, 166 and ground. The valve 166 opens, applying the trailer service brakes in the same manner as before until the trailer angle diminishes to less than 30°, whereupon the circuit is broken and the trailer brakes are released as valve 166 closes, exhausting to the atmosphere the pressure built up between it and the trailer relay emergency valve.

I claim:

1. A brake control for articulated vehicles having wheels and brakes therefor, a fifth wheel, a king pin, said control comprising cam means normally fixed on one unit against movement with respect to said unit of said vehicle, sensing means on another unit of said vehicle for contacting actuation by said cam means when the longitudinal axes of the units of said articulated vehicles reach a pre-determined angle with respect to one another, said cam means being solely responsive to angular movement of the vehicle units, and wheel brake operating means including connections actuated in response to operation of said sensing means for automatically applying the wheel brakes of at least one unit of said vehicle.

2. A control as in claim 1 wherein the brake operating means is pneumatic.

3. A control as in claim 1 wherein the brake operating means comprises an electric circuit having in it a solenoid valve.

4. A brake control for articulated vehicles having wheels and brakes therefor comprising cam means normally fixed against movement on one unit of said articulated vehicle, sensing means on another unit of said vehicle for contacting actuation by said cam means when the longitudinal axes of the units of said articulated vehicle reach a predetermined angle with respect to one another, and wheel brake operating means actuated in response to operation of said sensing means for automatically applying the wheel brakes of at least one unit of said vehicle, said cam means having a graduated surface and the brake operating means including a pressure reducing valve to meter controlled amounts of brake actuating pressure, the magnitude of said pressure being a function of the number of degrees by which the angle between said axes exceeds said pre-determined angle.

5. In vehicle construction of the class described, in combination, a first wheeled vehicle, a second wheeled vehicle in articulated connection thereto, brakes for the wheels of said vehicles, and control means for said brakes including normally fixed cam means and sensing means mounted on the vehicles, said means being relatively angularly removable with respect to each other on the respective vehicles, said sensing means being operable by the cam means when the longitudinal axes of the vehicles reach a predetermined angle with respect to each other, the sensing means including connections thereby initiating actuation of at least certain of the brakes of the vehicles.

6. The combination as claimed in claim 5, wherein the cam means is mounted on one vehicle, the sensing means is mounted on the other, and said means interengage during a predetermined angle of movement of the respective vehicles, means responsive to the extent of such movement effecting proportional movement of the sensing means and thereby operating the brake action in like proportion.

7. The combination as claimed in claim 5, wherein the brakes for the second vehicle are controlled by the sensing means independently of the brakes on the first vehicle.

8. The combination as claimed in claim 5, wherein the sensing means include instrumentalities to control the brakes of the second vehicle, in response to articulation of the vehicles, the extent of such articulation effecting proportional movement of the sensing means, and thereby the braking action of the second vehicle brakes.

9. The combination as claimed in claim 5, wherein the sensing means is connected to the brake system for the brakes of the second vehicle, operation of the sensing means effecting actuation of the second vehicle brakes through the system therefor.

References Cited in the file of this patent

UNITED STATES PATENTS

| | | |
|---|---|---|
| 2,188,727 | Soulis | Jan. 30, 1940 |
| 2,201,353 | Soulis | May 21, 1940 |
| 2,259,923 | Byrne et al. | Oct. 21, 1941 |
| 2,856,036 | Mullen | Oct. 14, 1958 |
| 2,976,964 | Thompson | Mar. 28, 1961 |